United States Patent [19]
Klaue et al.

[11] 3,796,046
[45] Mar. 12, 1974

[54] PROCESS FOR DETOXICATING EXHAUST GASES FROM OTTO-COMBUSTION ENGINES AND APPARATUS FOR CARRYING OUT SUCH PROCESS

[75] Inventors: Hans Joachim Klaue; Josef Reisacher, both of Frankenthal, Germany

[73] Assignee: Aktiengesellschaft Kuhnle, Kapp & Kausch, Frankenthal, Germany

[22] Filed: Apr. 30, 1971

[21] Appl. No.: 139,157

[30] Foreign Application Priority Data

| May 2, 1970 | Germany | 2021663 |
| July 8, 1970 | Germany | 2033794 |
| July 8, 1970 | Germany | 2033795 |

[52] U.S. Cl. ........................ 60/619, 60/280, 60/291
[51] Int. Cl. ............................................. F02b 37/04
[58] Field of Search ............... 60/13, 280, 291, 39.5

[56] References Cited
UNITED STATES PATENTS

| 2,583,651 | 1/1952 | Horning | 60/13 |
| 3,254,483 | 6/1966 | Martin et al. | 60/291 |
| 3,303,993 | 2/1967 | Andrews et al. | 60/280 |
| 3,355,878 | 12/1967 | Birmenn | 60/13 |
| 2,583,430 | 1/1952 | Kadenecy | 60/13 |
| 2,565,907 | 8/1951 | Bertin et al. | 60/13 |

*Primary Examiner*—Al Lawrence Smith
*Assistant Examiner*—Warren Olsen
*Attorney, Agent, or Firm*—McGlew & Tuttle

[57] ABSTRACT

Exhaust gases emanating from an internal combustion engine, such as an Otto-cycle engine, have a swirl imparted thereto by a twist generator to expand the exhaust gases and to reduce the pressure thereof. Air is aspirated into the expanded exhaust gases for admixture therewith to provide a combustible gas-air mixture which is delivered to a diffusor for after-burning of the toxic ingredients of the exhaust gases with an increase in pressure of the products of combustion. The exhaust gases flowing to the twist generator pass through a heat exchanger serving to preheat the combustion air. The twist generator may be a set of stationary whirl-imparting vanes, or may be the rotor of an exhaust gas turbo charger directly driving an air compressor which delivers the air through the heat exchanger to the turbo charger, with some of the compressed air being delivered back to the engine. The flow area of the outlet of the twist generator is adjustable to adjust the quantity of air aspirated into the exhaust gases supplied to the diffusor.

3 Claims, 7 Drawing Figures

PATENTED MAR 12 1974

INVENTORS
HANS JOACHIM KLAUE, JOSEF REISACHER
BY: John J. McGlew
ATTORNEY

INVENTORS
HANS JOACHIM KLAUE and JOSEF REISACHER
BY: John J. M°Glew
ATTORNEY

PROCESS FOR DETOXICATING EXHAUST GASES FROM OTTO-COMBUSTION ENGINES AND APPARATUS FOR CARRYING OUT SUCH PROCESS

SUMMARY OF THE INVENTION

The invention concerns a process for detoxifying exhaust gases from Otto-engines and apparatus for carrying out this process.

The purpose of such a process is to eliminate toxic but still combustible portions of carbon monoxide and CH-compounds, present in exhaust gases of Otto-engines, through an after-combustion step.

Processes and devices for carrying out after combustion were heretofore known and are usually connected to the exhaust pipe system of the Otto-engine. These known combustion systems or plants have the disadvantage that they require a combustion chamber with extensive equipment, particularly an air delivery pump which feeds the required air into the exhaust gases to effectuate the combustion.

The present invention is based on the task of detoxicating exhaust gases and of developing an apparatus and instrumentalities which are considered markedly simplified and radically less expensive than heretofore known detoxicating and after combustion systems. The solution of such problem pursuant to the invention by means of a process for detoxifying exhaust gases from Otto-combustion engines is characterized in that the exhaust gases are first expanded to create a relatively low pressure (underpressure) between a twist generator and a diffusor, so that combustion air is sucked in by the partial vacuum formed, and that the after combustion step takes place in the diffusor in which the pressure will rise again.

When the air required for the after combustion is sucked in, a thorough mixing of exhaust gas and air is effectuated so that the after combustion becomes substantially complete in the subsequent diffusor part of the novel apparatus.

Another improvement of the after combustion is achieved according to the invention in that the turbine rotor of a waste or exhaust gas turbo-supercharger is used as a twist generator for bringing about the expansion of the exhaust gases, this turbine driving a compressor, which delivers the air for the after combustion process. The compressed air introduced into the cycle mixes particularly well with the exhaust gases so that, when an exhaust gas turbo-supercharger is used, practically all harmful constituents of the exhaust gas are burnt and disposed of.

The use of an exhaust gas turbo-supercharger has the further advantage that the Otto-engine can be supercharged, so that the performance and output of the Otto-engine is increased.

Preferably a heat exchanger is arranged in the path of the exhaust gas between the Otto-engine and the twist generator, to effect preheating of the air required for the after combustion.

A plant or apparatus for carrying out the process pursuant to the invention has preferably a stationary twist generator provided with guide vanes or blades after which is arranged e.g., a radial diffusor acting as an after combustion chamber.

One of the important objects of the invention is to provide means achieving a highly desirable, more economical and complete burning of the toxic constituents of exhaust gases.

A further object and advantage of the invention is to provide means resulting in the employment of the exhaust turbo supercharger on one and the same drive shaft as a turbine for the exhaust gases, whereby the turbine functions as a radial or diagonal turbine with external or peripheral intake and axial discharge. The blade wheel of the turbine serves in such case as a twist generator which is non-stationary, to which is subsequently disposed a radial diffusor near the discharge end of the turbine blade wheel.

These and other advantageous features and characteristics of the invention are derived from the drawings and claims.

DETAILED DESCRIPTION OF PREFERRED EMBODIMENTS

Referring now more specifically to the attached drawings, M denotes the Otto-engine, A the exhaust-gas-carrying lines and L the air-feed lines. The exhaust gases are conducted from the piston engine M via the heat exchanger WT to the twist generator DE, where they are expanded. Subsequently they enter the diffusor NB which serves and is designed as an after-burner.

The air required for the after-combustion flows via the heat exchanger WT, in which it is heated up by means of the exhaust gas heat, to the twist generator DE and thence — mixing with the exhaust gases thoroughly — into the afterburner, where the toxic constituents of the exhaust gas, CO- and CH-compounds are burnt.

Figure 1:
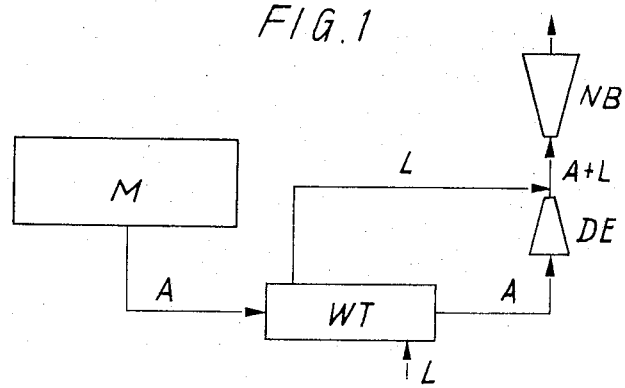
FIG. 1 shows in block diagram one of several possible processes pursuant to the invention.
Figure 2:
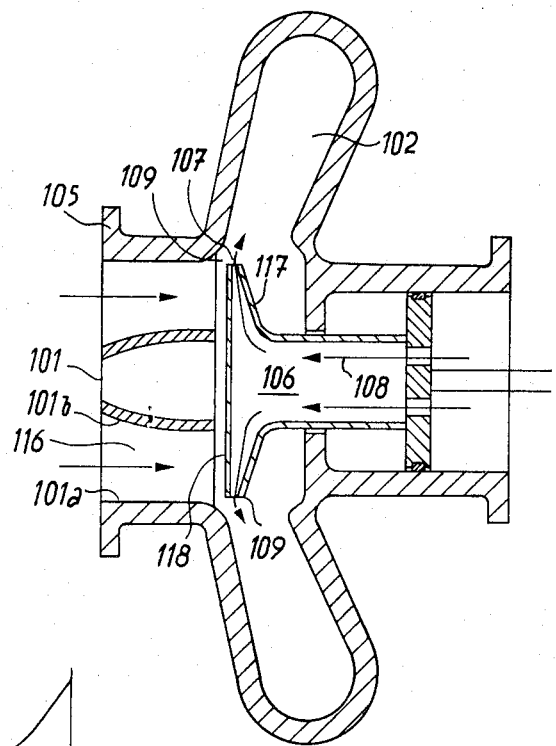
FIG. 2 is an axial sectional view of a stationary twist generator.

FIG. 2 shows in axial section through an embodiment constituting a twist generator 101 with a radial diffusor 102 and a control shield or device 106, which has a wall 118 facing the twist generator and a further wall 117 remote thereof, and which is axially displaceable in order to regulate and check the size of the effective outlet cross section 109 for the gas flow from the twist generator 101.

Figure 3:
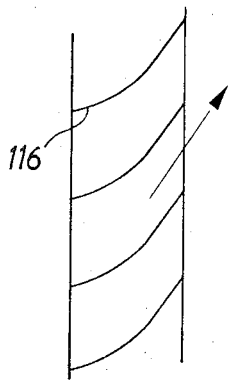
FIG. 3 shows the development of a cylinder section through blades of the twist generator.

The twist generator is connected directly to the exhaust line, for example, by means of flange 105. The exhaust gases arriving from the engine flow to the twist generator 101 and are set in rotation by the guide blades 116 (see arrow in FIG. 3) Their velocity will be increased more or less depending on the relative axial position of the control device 106. According to the theorem of Bernoulli the static pressure in cross section 109 can be reduced so far that the air is sucked in through slot 107 which remains between the two walls 117,118. The supply of air can take place as indicated by arrows 108, after the air has been heated preferably in a heat exchanger (not shown).

The exhaust gas-air mixture enters then subsequently with great twirl the radial diffusor 102 which serves at the same time as an aftercombustion chamber. Due to the thorough and intimate mixing of the exhaust gases with air on the basis of great turbulence effected by the strong twirl, the combustion of the toxic CO- and CH-constituents of the exhaust gases becomes practically complete. An air pump is not required and is dispensed with according to the invention.

The regulation of the twirl by the axial displacement of the wall 118 permits an optimum adjustment on one hand of the air intake, and of the back pressure of the exhaust gases on the other hand toward the engine.

Furthermore means or instrumentalities can be provided with respect to the diffusor 102 designed as an after-combustion chamber which permits a primary ignition and/or a stabilization of the flames in a critical state of operation.

The process and plant for detoxifying the exhaust gases according to the invention have the great advantage that the various functions explained hereinabove are performed in a minimum of space with a minimum number of parts and without any moving parts for the essential operational steps. No auxiliary devices or accessories are required for delivering the air. The plant or apparatus described is thus simple and inexpensive and its operation is safe and highly economical.

Figure 4:
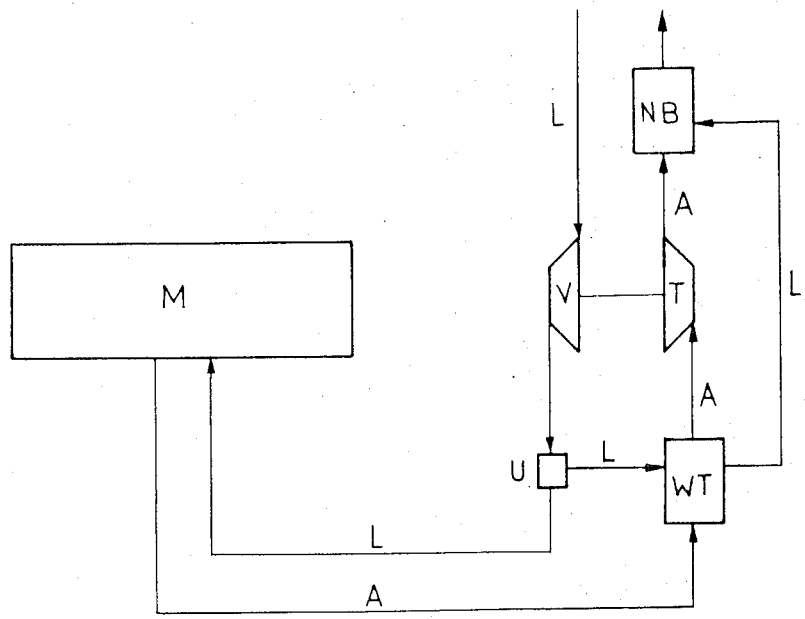
FIG. 4 is a further block diagram illustrating the employment of an exhaust-gas turbo-supercharger in a preferred process.

FIG. 4 shows in block diagram a process according to the invention employing an exhaust gas turbo-supercharger as a twist generator.

M denotes the Otto-engine, A the exhaust-gas-carrying lines, L the air-supply lines. The exhaust gases are conducted from the Otto-engine via the heat exchanger WT to the turbine T of the exhaust gas turbo-supercharger, where they are expanded. From the turbine they are led into the afterburner NB. The turbine drives the compressor V of the exhaust gas turbo-supercharger which delivers the air to a manifold or distributor U. The air required for the after-combustion flows via the heat exchanger WT, in which it is heated by means of the exhaust gas heat, into the afterburner NB, where it burns the toxic constituents of the exhaust gas, namely, carbon monoxide and the CH-compounds. A part of the air may be conducted from the manifold U to the engine M for supercharging. In stages of operation which are outside the range of the exhaust gases or where there is no danger that toxic constituents are contained in harmful quantities in the exhaust gas, the entire or a large quantity of charging air may be used for increasing the output of the engine.

Figure 5:
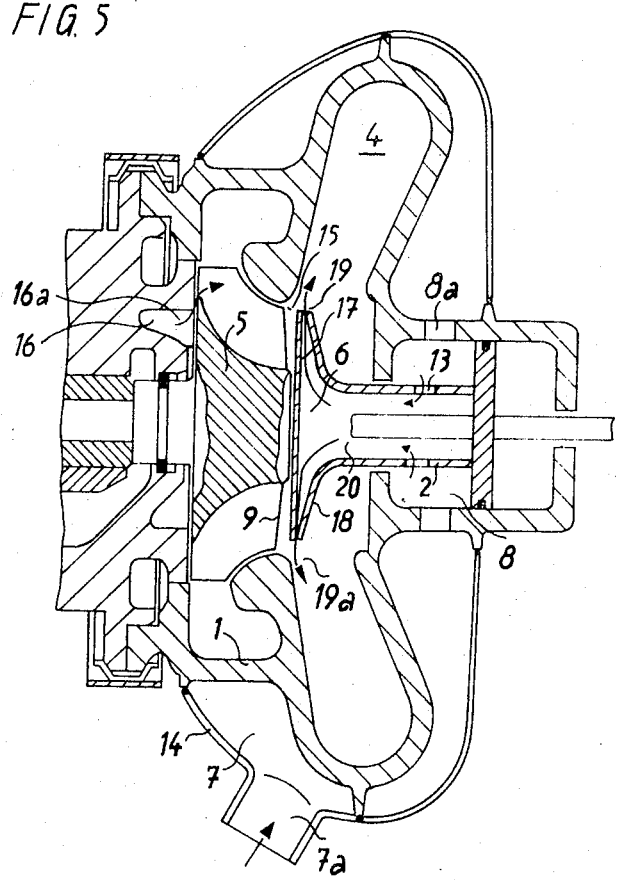
FIG. 5 is an axial sectional view of the turbine of an exhaust gas turbo-supercharger to which a radial diffusor is connected in series.

FIG. 5 shows an axial section through the turbine of an exhaust gas turbo-supercharger which can be used with particular advantage for the detoxification of exhaust gases pursuant to the invention. The exhaust gas turbo-supercharger here shown differs from known devices particularly in that it has a control element 2 which can be axially displaced together with the control device or shield 6, and is able to shut off variably a part of the outlet cross section of the turbine wheel 5. The more this outlet cross section is reduced, the higher is the speed and the charging pressure of the exhaust gas turbo-charger. It is thus possible to obtain a sufficiently high and possibly uniform charging pressure for different speeds and different loads of the Otto engine. The regulation may also be effected additionally by varying the flow cross section with respect to the inlet-spiral of the turbine.

The air supplied for the after-combustion is introduced, in the turbine according to FIG. 5, into a chamber 8 around control element 2 through inlet openings (8a). From there it flows through bores 13 into the interior, as indicated by the respective arrows.

The control device 6 consists, in this embodiment, of a wall 17 facing the turbine wheel and of a wall 18 remote of this wheel. Between these two walls there are disposed slots 19 along the circumference of the walls. The air for the gas combustion, which flows through the bores 13 in axial direction along chamber 20 of the control device 6, passes through these slots 19 out of the control device 6. The exhaust gases from the turbine wheel are forced to flow at high velocity through the cross section 15 between the outlet edge 9 of the wheel and wall disk 17 of the control device 6. They produce thus at the slots 19 a suction effect, so that the air is additionally sucked in.

After combustion air (arrow 16a) may also be supplied from chamber 16 on the rear side of the turbine wheel 5. This results in the further advantage that the hot turbine wheel 5 will be cooled, which permits under certain circumstances the use of a less heat-resistant and thus cheaper material for the turbine wheel 5.

The exhaust gas turbo charger represented in FIG. 5 has a radial diffusor 4 which permits a particularly effective utilization of the exhaust gas energy by reducing the outlet pressure, if necessary, even below atmospheric pressure. This radial diffusor serves at the same time as an afterburner, and a practically complete combustion of the toxic constituents is achieved by the annular splitting of the exhaust gas flow and the annular dosed admixture of after combustion air.

The radial diffusor increases the suction effect at slots 19, so that a greater pressure gradient is available for the admixture than for supercharging the engine. This is of particular advantage for the idle run where the supercharge anyway does not occur through the action of the throttle valve.

Means may also be provided which permit a first or initial ignition or a stabilization of the flame in critical operating ranges.

A particularly advantageous design was created for the heat exchanger of the process according to the invention. It is characterized in that a part of the exhaust pipe 21 or of the turbine housing 1 or generally, the housing of the twist generator and of the diffusor, is designed as a heat exchanger for treating the after combustion air.

Figure 6:
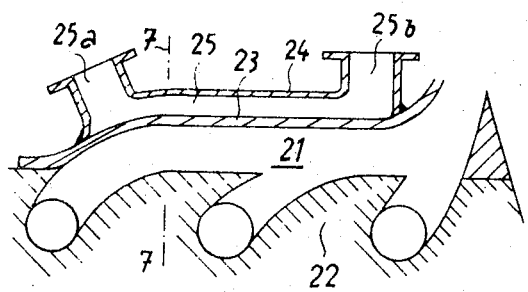
FIG. 6 is a longitudinal sectional view through a part of an exhaust system which is used as a heat exchanger.
Figure 7:
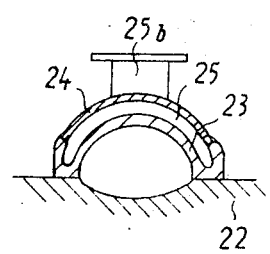
FIG. 7 is a sectional view taken along line 7 — 7 of FIG. 6.

FIGS. 6 and 7 show an embodiment employing the exhaust pipe 21 for this purpose. FIG. 6 represents a longitudinal section through a part of the exhaust system of the engine, where the exhaust pipe is arranged closely enough to the cylinder block 22, so that a boundary surface is formed by the latter. The substantially semi-circular shell of the exhaust pipe 23 is surrounded by a substantially semicircular jacket 24. The space 25 between pipe 23 and jacket 24 is then traversed by the air available for the after-combustion entering through inlet 25a and leaving through socket 25b and a good heat exchange is achieved on account of the relatively large contact surface and the high velocities.

In the exhaust gas turbocharger according to FIG. 5 the turbine housing 1 is surrounded by a jacket 14. The interspace is traversed by the after combustion air which is preheated by the relatively hot turbine housing 1. The air enters through inlet 7a into the interspace 7.

The process and the plant for detoxificating exhaust gases according to the invention have the advantage in that a substantially complete burning of the toxic constituents of the exhaust gas is afforded so that practically no carbon monoxide and no CH-compound remain anymore. Since the aftercombustion takes place in the exhaust gas-turbine of the turbocharger a special after combustion chamber is not required. The plant becomes therefore greatly simplified and relatively inexpensive. An additional advantage is that a part of the charged air can be employed to improve the output of the engine. Auxiliary devices such as the mechanically driven air delivery pump usually employed in conventional methods, become likewise unnecessary.

While specific embodiments of the invention have been shown and described in detail to illustrate the application of the principles of the invention, it will be understood that the invention may be embodied otherwise without departing from such principles.

What is claimed is:

1. Apparatus for the detoxification of the exhaust gases of an internal combustion engine having an exhaust gas discharge line, said apparatus comprising in combination, a twist generator connected to said discharge line to receive the exhaust gas, said twist generator imparting a whirl to the exhaust gases and expanding the exhaust gases to a substantially reduced pressure for the discharge through an outlet; an air supply line communicating with said outlet for aspiration of combustion air into the expanded exhaust gases at said outlet for admixture with the exhaust gases to provide a combustible gas-air mixture; and a diffusor connected to said outlet to receive the combustible mixture for after-burning of the toxic ingredients of the exhaust gases in said diffusor with an increase of pressure of the products of combustion; said twist generator comprising the turbine of an exhaust gas turbo-supercharger; and a compressor driven by said turbine and supplying air to said air supply line.

2. The apparatus according to claim 1, characterized in that only a part of the air supplied by said compressor is used for the after-combustion, while the remainder of said supplied air is directed to the engine for supercharging.

3. The apparatus according to claim 1, characterized in that said exhaust gas turbine (T) and said compressor (V) are arranged on a common shaft and that the turbine (T) is designed as a substantially radial flow-type turbine with external inflow and axial outflow, said turbine including a rotor (5) actuable as a twist generator, said radial flow-type diffusor being disposed at the discharge outlet of said turbine rotor.

* * * * *